United States Patent
Tsai et al.

(10) Patent No.: US 8,661,040 B2
(45) Date of Patent: Feb. 25, 2014

(54) GRID-BASED DATA CLUSTERING METHOD

(75) Inventors: Cheng-Fa Tsai, Pingtung (TW);
Chun-Hao Chang, Pingtung (TW)

(73) Assignee: National Pingtung University of Science & Technology, Pingtung County (TW)

( * ) Notice: Subject to any disclaimer, the term of this patent is extended or adjusted under 35 U.S.C. 154(b) by 93 days.

(21) Appl. No.: 13/468,721

(22) Filed: May 10, 2012

(65) Prior Publication Data
US 2012/0296906 A1 Nov. 22, 2012

(30) Foreign Application Priority Data
May 17, 2011 (TW) .............................. 100117242 A

(51) Int. Cl.
*G06N 5/00* (2006.01)
*G06F 17/30* (2006.01)

(52) U.S. Cl.
USPC ............................................ 707/737; 706/45

(58) Field of Classification Search
USPC ..................... 706/45; 707/737, 776
See application file for complete search history.

(56) References Cited

U.S. PATENT DOCUMENTS

| | | | |
|---|---|---|---|
| 7,174,344 B2 | 2/2007 | Campos et al. | |
| 7,359,913 B1 * | 4/2008 | Ordonez | 1/1 |
| 7,565,346 B2 * | 7/2009 | Fan et al. | 1/1 |
| 7,584,159 B1 | 9/2009 | Chakrabarti et al. | |
| 7,590,642 B2 | 9/2009 | Campos et al. | |
| 7,853,542 B2 | 12/2010 | Tsai et al. | |
| 8,166,035 B2 | 4/2012 | Tsai et al. | |
| 8,438,162 B2 * | 5/2013 | King et al. | 707/737 |

OTHER PUBLICATIONS

Berkhin, A Survey of Clustering Data Mining Techniques, 2006, Springer, pp. 25-71.*
Berkhin et al., Knowledge Discovery: Clustering, 2009, Springer, pp. 5051-5064.*
Kriegel et al., Clustering High-Dimensional Data: A Survey on Subspace Clustering, Pattern-Based Clustering, and Correlation Clustering, Mar. 2009, ACM Transactions on Knowledge Discovery from Data, vol. 3, No. 1, Article 1, pp. 1-58.*

* cited by examiner

*Primary Examiner* — Jorge A Casanova
(74) *Attorney, Agent, or Firm* — Muncy, Geissler, Olds & Lowe, P.C.

(57) ABSTRACT

A grid-based data clustering method performed by a computer system includes a setup step, a dividing step, a categorizing step and an expanding/clustering step. The setup step sets a grid quantity and a threshold value. The dividing step divides a space containing a data set having a plurality of data points into a two-dimensional matrix. The matrix has a plurality of grids $G(i,j)$ comprising a plurality of target sequences and a plurality of non-target sequences interlaced with the plurality of target sequences. The indices "i" and "j" of each grid $G(i,j)$ represents the coordinate thereof. The categorizing step determines whether each of the grids is valid based on the threshold value. The expanding/clustering step respectively retrieves each of the grids of the target sequences, performs an expansion operation on each of the grids retrieved and clusters the plurality grids $G(i,j)$.

17 Claims, 12 Drawing Sheets

| 30 | 64 | 183 | 104 | 101 | 64 |
|---|---|---|---|---|---|
| 70 | 64 | 213 | 291 | 256 | 59 |
| 98 | 133 | 227 | 351 | 203 | 106 |
| 68 | 66 | 259 | 320 | 313 | 55 |
| 64 | 59 | 44 | 305 | 83 | 92 |
| 60 | 30 | 48 | 95 | 63 | 98 |

GRID-BASED DATA CLUSTERING METHOD

BACKGROUND OF THE INVENTION

1. Field of the Invention

The present invention generally relates to a data clustering method and, more particularly, to a grid-based data clustering method.

2. Description of the Related Art

As technology continues to grow, a larger and larger amount of data can be stored in a database. Through provision of data mining technology, a user is allowed to dig out useful information from an original data having a plurality of data sets, so as to find out implicit characteristics and relations among the plurality of data sets. Data clustering methods provided by the data mining technology allows one to quickly recognize intrinsic correlations among a plurality of data. The data with high similarities are clustered together as the same cluster based on customized dimensional characteristics. Nowadays, there are a variety of data clustering methods, such as division-based data clustering method, density-based data clustering method, grid-based data clustering method, hierarchical data clustering method, etc. The following representative data clustering methods are described below.

A. DBSCAN data clustering method. The method is a density-based data clustering method that was proposed by M. Ester et al. in 1996. In a first step of the method, one of a plurality of data points contained in a data set is randomly selected as an initial seed. In a second step, it is determined whether the quantity of the data points contained in a circular coverage, which is expanded from the initial seed in a radius, is larger than a threshold value. If so, all data points contained in the circular coverage are clustered as a cluster and acknowledged as seeds. The same expansion operation of the initial seed is performed on each of the seeds to gradually expand the cluster. In a third step, the second step is repeatedly performed until all data points in the data set are clustered. Because the method performs data clustering operations based on density of data points, the method can filter noise data points (the data points with low density) and can be applied to data points with an irregular pattern. However, it takes considerable time to cluster all data points as every data point requires the same density determination, leading to long execution times. In addition, it is also difficult to choose the parameter values.

B. IDBSCAN data clustering method. The method was proposed by B. Borah et al. in 2004, aiming at improving the DBSCAN data clustering method. In a first step of the method, one of a plurality of data points is randomly selected as an initial seed. In a second step of the method, 8 representative points are arranged on an expanded range of the initial seed, and added to a seed list as seeds in order for an expansion operation to be performed on the seeds. In a third step of the method, the second step is repeatedly preformed until all data points are clustered. The IDBSCAN data clustering method does efficiently reduce the time consumption of the DBSCAN data clustering method. However, the amount of time saved is still limited as the density determination is still required for the 8 representative points.

Generally, the above conventional data clustering methods have been criticized for long operation times and difficulties in determining parameter values. In light of this, a number of data clustering methods were proposed to overcome the defects of the aforementioned data clustering methods. Here, the GOD-CS data clustering method is taken as an example for illustration purpose.

As proposed in Taiwan Patent Publication No. 201107999 entitled "GRID-BASED DATA CLUSTERING METHOD", the GOD-CS data clustering method is a grid-based data clustering method which incorporates the conventional density-based data clustering method with the division-based data clustering method. The GOD-CS data clustering method improves upon the conventional ANGEL and G-TREACLE data clustering methods. In a first step of the GOD-CS data clustering method, a space containing a data set having a plurality of data points is divided into a plurality of grids according to a given grid quantity. In a second step of the GOD-CS data clustering method, a high-density grid that has not yet undergone an expansion operation is determined based on a density determination rule. The high-density grid is taken as an initial grid and added to a seed list as a seed. In a third step of the GOD-CS data clustering method, a seed is selected from the seed list in order to determine whether the selected seed is a high-density grid or low-density grid. If the selected grid is a high-density grid, the procedure proceeds to a next step. If the grid is a low-density grid, the seed is deleted from the seed list and the third step is re-performed. In a fourth step of the GOD-CS data clustering method, all data points in the seed are clustered together as the same cluster, and the surrounding grids of the seed that have not yet undergone the expansion operation are added to the seed list as seeds. Then, the central seed is deleted from the seed list, and the third step is re-performed. The procedure proceeds to a fifth step after all seeds in the seed list are processed. In the fifth step of the GOD-CS data clustering method, it is determined whether all high-density grids have already undergone the expansion operation. If so, the procedure is terminated. If not, the third step is re-performed. In contrast to the conventional ANGEL data clustering method, the GOD-CS data clustering method can reduce the time consumption and provide a convenient use through a simplified parameter setting procedure.

In the above conventional data clustering methods, a data cluster is expanded by searching 8 surrounding grids of a central grid (such as the GOD-CS method) or by searching all grids located in a horizontal or vertical direction of the central grid. When the data cluster is expanded to the grids that can be merged, grid merging is performed to improve the noise filtering rate and the data clustering accuracy. However, searching every single grid will result in repeated searches of a lot of grids, leading to long execution times and lowering the data clustering efficiency.

In light of the problem, it is necessary to provide a grid-based data clustering method with high data clustering accuracy and convenient use.

SUMMARY OF THE INVENTION

It is therefore the primary objective of this invention to provide a grid-based data clustering method which improves the data clustering efficiency by reducing the number of times the grids will be retrieved.

It is another objective of this invention to provide a grid-based data clustering method with a simplified parameter-setting procedure. Thus, convenient use can be provided.

An embodiment of the invention discloses a grid-based data clustering method performed by a computer system. The method includes a setup step, a dividing step, a categorizing step and an expanding/clustering step. The setup step sets a grid quantity and a threshold value. The dividing step divides a space containing a data set having a plurality of data points into a two-dimensional matrix. The matrix has a plurality of grids $G(i,j)$ comprising a plurality of target sequences and a plurality of non-target sequences interlaced with the plurality of target sequences. The indices "i" and "j" of each grid G(i,j) represents the coordinate thereof. The categorizing step determines whether each of the grids is valid based on the threshold value. The expanding/clustering step respectively retrieves each of the grids of the target sequences, performs an expansion operation on each of the grids retrieved and clusters the plurality grids G(i,j).

In a preferred form shown, both dimensions of the matrix have a quantity of grids being the grid quantity.

In the preferred form shown, the categorizing step determines whether a number of the data points contained in each grid G(i,j) is smaller than the threshold value. If the number of the data points contained therein is smaller than the threshold value, the grid G(i,j) is acknowledged as an invalid grid. If the number of the data points contained therein is not smaller than the threshold value, the grid G(i,j) is acknowledged as a valid grid.

In the preferred form shown, the plurality of target sequences is designated as odd rows, even rows, odd columns or even columns of the matrix.

In the preferred form shown, the expanding/clustering step comprises a determination step, an expansion step and a clustering step. The determination step respectively sets one of the grids G(i,j) of the target sequences as a target grid Gt(i,j), and determines whether all the grids G(i,j) of the target sequences are retrieved. The procedure is terminated if the determination of the determination step is positive. The expansion step determines an expansion range of the target grid Gt(i,j) based on whether the target grid Gt(i,j) is valid or not. The clustering step performs a clustering operation based on the expansion range of the target grid Gt(i,j), and re-performs the determination step.

In the preferred form shown, grids G(i+1,j) and G(i+1,j−1) of the matrix are covered in the expansion range when the target grid Gt(i,j) is invalid.

In the preferred form shown, grids G(i+1,j), G(i+1,j−1), G(i,j−1) and G(i−1,j) of the matrix are covered in the expansion range when the target grid Gt(i,j) is valid.

In the preferred form shown, it is determined whether the grid G(i+1,j−1) is belonged to a cluster if the grid G(i+1,j) is valid. If the determination is positive, the grid G(i+1,j) is merged into the cluster of the grid G(i+1,j−1). If the determination is negative, the grid G(i+1,j) is acknowledged as an independent cluster.

In the preferred form shown, the determination step is re-performed if the grid G(i+1,j) is invalid.

In the preferred form shown, it is determined whether the grids G(i+1,j−1), G(i,j−1) and G(i−1,j) are belonged to at least one cluster if the grid G(i+1,j) is valid. If the determination is positive, the target grid Gt(i,j) and the grid G(i+1,j) are merged with the at least one cluster as a merging cluster. If the determination is negative, the target grid Gt(i,j) and the grid G(i+1,j) are merged as an independent cluster.

In the preferred form shown, it is determined whether the grids G(i,j−1) and G(i−1,j) are belonged to at least one cluster if the grid G(i+1,j) is invalid. If the determination is positive, the target grid Gt(i,j) is merged with the at least one cluster as a merging cluster. If the determination is negative, the target grid Gt(i,j) is acknowledged as an independent cluster.

In the preferred form shown, grids G(i,j+1) and G(i−1,j+1) of the matrix are covered in the expansion range when the target grid Gt(i,j) is invalid.

In the preferred form shown, grids G(i,j+1), G(i−1,j+1), G(i−1,j) and G(i,j−1) of the matrix are covered in the expansion range when the target grid Gt(i,j) is valid.

In the preferred form shown, it is determined whether the grid G(i−1,j+1) is belonged to a cluster if the grid G(i,j+1) is valid. If the determination is positive, the grid G(i,j+1) is merged into the cluster of the grid G(i−1,j+1). If the determination is negative, the grid G(i,j+1) is acknowledged as an independent cluster.

In the preferred form shown, the determination step is re-performed if the grid G(i,j+1) is invalid.

In the preferred form shown, it is determined whether the grids G(i−1,j+1), G(i−1,j) and G(i,j−1) are belonged to at least one cluster if the grid G(i,j+1) is valid. If the determination is positive, the target grid Gt(i,j) and the grid G(i,j+1) are merged with the at least one cluster as a merging cluster. If the determination is negative, the target grid Gt(i,j) and the grid G(i,j+1) are merged as an independent cluster.

In the preferred form shown, it is determined whether the grids G(i−1,j) and G(i,j−1) are belonged to at least one cluster if the grid G(i,j+1) is invalid. If the determination is positive, the target grid Gt(i,j) is merged with the at least one cluster as a merging cluster. If the determination is negative, the target grid Gt(i,j) is acknowledged as an independent cluster.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 4 shows a plurality of grids each specifying the quantity of data points contained therein according to the preferred embodiment of the invention.

FIG. 8c shows yet another example of the expansion step of the expanding/clustering step of the grid-based data clustering method.

FIG. 8d shows yet another example of the expansion step of the expanding/clustering step of the grid-based data clustering method.

FIG. 8e shows yet another example of the expansion step of the expanding/clustering step of the grid-based data clustering method.

FIG. 8f shows yet another example of the expansion step of the expanding/clustering step of the grid-based data clustering method.

Figure 1:
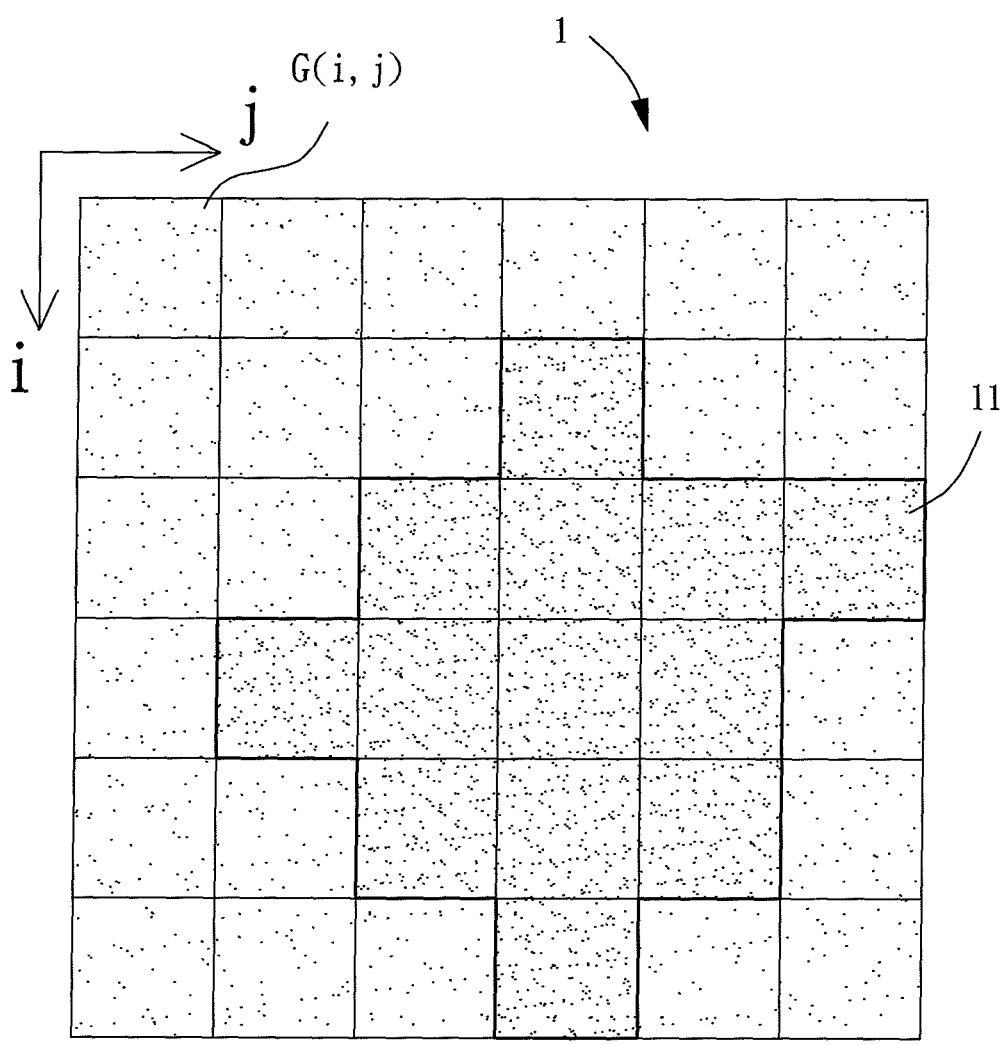
FIG. 1 shows a data set containing a plurality of data points according to a preferred embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
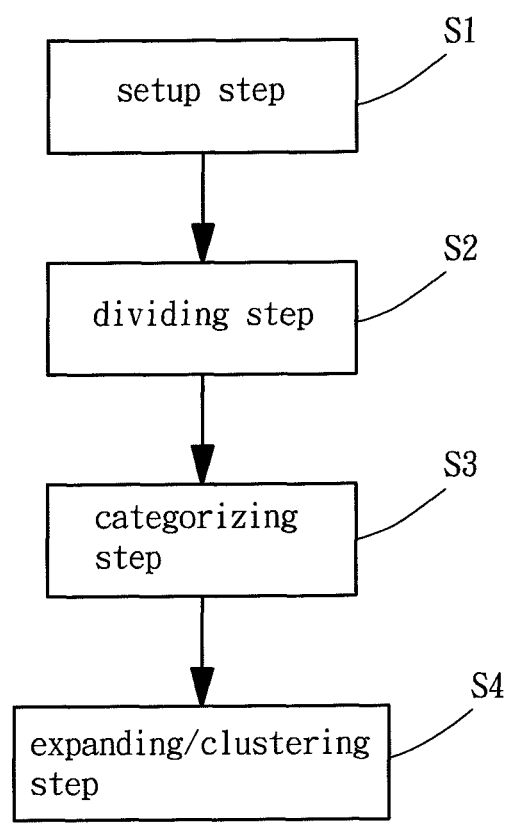
FIG. 2 shows a flowchart of a grid-based data clustering method of the preferred embodiment of the invention.

Referring to FIGS. 1 and 2, the proposed grid-based data clustering method is performed by a computer system connected to at least one database having a data set 1. The data set 1 consists of a plurality of data points 11 distributed in a two-dimensional space. The method comprises a setup step S1, a dividing step S2, a categorizing step S3 and an expanding/clustering step S4. Based on the steps S1 to S4, the invention can accurately cluster the data points 11 of the data set 1.

Referring to FIGS. 1 and 2 again, the setup step S1 is configured to set a grid quantity Q and a threshold value M. Specifically, the grid quantity Q refers to the quantity of grids each dimension of the two-dimensional space is divided into. As an example, the space containing the data set 1 is divided into a matrix having N grids in both column and row. Thus, the total quantity of the grids is N by N. The larger quantity of grids the space is divided into the finer the data set 1. The threshold value M refers to the number of data points that are required to be contained in a grid when the grid is acknowledged as a valid grid. Because the total number of the data points 11 is fixed, the threshold value M should be reduced when the grid quantity Q increases. To the contrary, the threshold value M should be increased when the grid quantity Q decreases.

Figure 3:
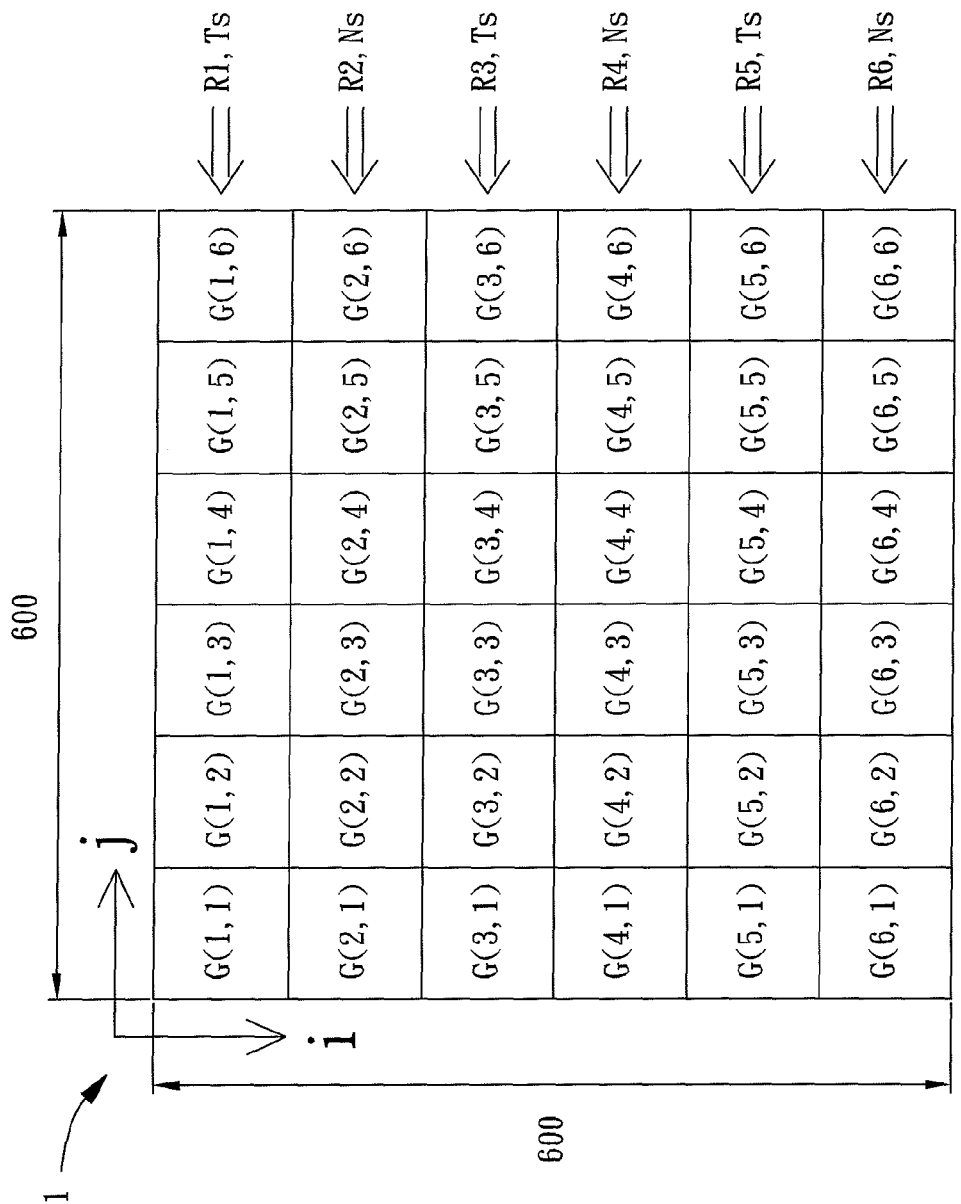
FIG. 3 shows a grid arrangement of the preferred embodiment of the invention.

Referring to FIGS. 1, 2 and 3, the dividing step S2 is configured to divide the space containing the data set 1 into a plurality of grids G(i,j). The grids G(i,j) are categorized into a plurality of target sequences Ts and a plurality of non-target sequences Ns interlaced with the plurality of target sequences Ts. In this embodiment, the space containing the data set 1 is in two dimensions. First, a maximum coordinate value of the data set 1 in each dimension is determined. As such, two maximum coordinate values of the data set 1 can be obtained for two dimensions. The two maximum coordinate values are compared and the one with larger value is chosen to determine the length of grids. Namely, the length of grids is calculated based on the larger maximum coordinate value and the grid quantity Q, allowing the data set 1 to have N grids in both dimensions. Then, the grid to which individual data point 11 is belonged is determined. Thus, each data point 11 may be determined to be in an individual grid. The grids G(i,j) are distributed in the space, wherein i=1, 2, ..., N; j=1, 2, ..., N. As stated previously, the grids G(i,j) are categorized into the plurality of target sequences and the plurality of non-target sequences interlaced with the plurality of target sequences. For instance, the plurality of target sequences is designated as rows 1, 3, 5 and so on. Namely, the plurality of target sequences may be designated as odd rows formed by the grids G(i,j) wherein i=1, 3, 5, ..., N/N−1; j=1, 2, ..., N. Similarly, the plurality of non-target sequences is designated as rows 2, 4, 6 and so on. Namely, the plurality of non-target sequences may be designated as even rows formed by the grids G(i,j) wherein i=2, 4, 6, ..., N/N−1; j=1, 2, ..., n. Alternatively, the plurality of target sequences may be designated as even rows, and the plurality of non-target sequences may be designated as odd rows. Alternatively, as shown in FIG. 3, the plurality of target sequences is designated as columns 1, 3, 5 and so on. Namely, the plurality of target sequences may be designated as odd columns formed by the grids G(i,j) wherein i=1, N; j=1, 3, 5, ..., N/N−1. Similarly, the plurality of non-target sequences is designated as columns 2, 4, 6 and so on. Namely, the plurality of non-target sequences may be designated as even columns formed by the grids G(i,j) wherein i=1, N; j=2, 4, 6, ..., N/N−1. Alternatively, the plurality of target sequences may be designated as even columns, and the plurality of non-target sequences may be designated as odd columns. In the embodiment, the plurality of target sequences is designated as odd rows, but is not limited thereto.

As an example, referring to FIG. 3 again, when the grid quantity Q is set as 6 and both the maximum coordinate values of the data set 1 in the two dimensions are 600, the space containing the data set 1 is divided into 6 grids in each dimension. In this manner, the space is expressed as grids G(i,j) wherein i=1, N; j=1, 2, ..., N. Therefore, as shown in FIG. 3, the space is expressed as grids G(1,1), G(1,2), G(1,3), ..., G(6,5) and G(6,6), with each grid having a length of 100 in both dimensions. Then, the grid to which individual data point 11 is belonged is determined, as shown in FIG. 1. The plurality of target sequences is designated as odd rows (i.e. R1, R3 and R5), and the plurality of non-target sequences is designated as even rows (i.e. R2, R4 and R6). The row R1 contains the grids G(1,1), G(1,2), ..., G(1,5) and G(1,6). The row R2 contains the grids G(2,1), G(2,2), ..., G(2,5) and G(2,6). The same can be applied to the rows R3, R4, R5 and R6.

Figure 5:
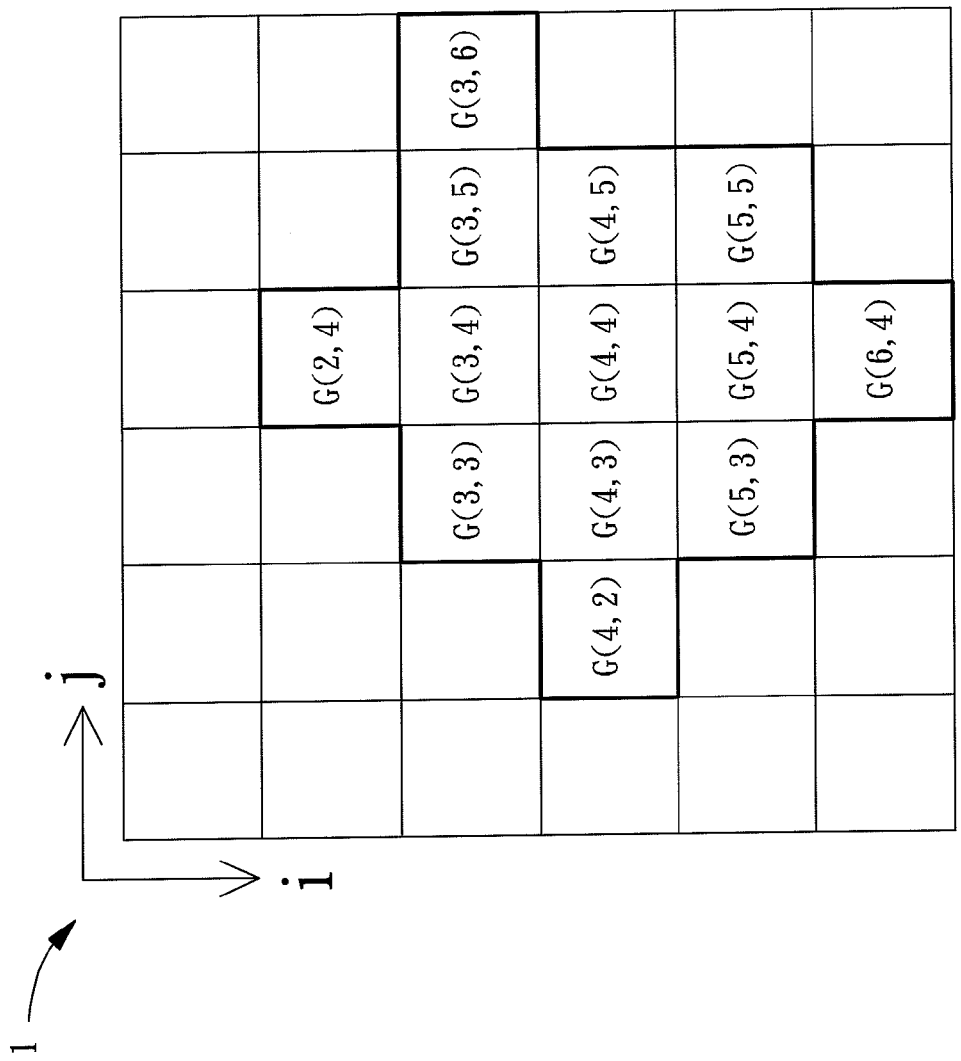
FIG. 5 shows the plurality of grids containing valid and invalid grids according to the preferred embodiment of the invention.

Referring to FIGS. 1 and 2, the categorizing step S3 is configured to determine whether the individual grid G(i,j) is valid based on the threshold value M. Specifically, it is determined whether the number of data points 11 contained in individual grid G(i,j) is smaller than the threshold value M. If so (the determination is positive), the grid G(i,j) is acknowledged as an invalid grid. Thus, the data points 11 contained in the invalid grid are acknowledged as noise data points. The number of noise data points will be used to calculate a noise filtering rate. To the contrary, if the number of data points 11 contained in individual grid G(i,j) is not smaller than the threshold value M, the grid G(i,j) is acknowledged as a valid grid. For example, as shown in FIG. 4, the number shown in individual grid G(i,j) represents the number of data points 11 contained in the grid G(i,j). Assume the threshold value M is 105, the grids G(2,4), G(3,3) to G(3,6), G(4,2) to G(4,5), G(5,3) to G(5,5), and G(6,4) are acknowledged as valid grids, as shown in FIG. 5. The remaining grids G(i,j) are acknowledged as invalid grids.

Figure 6:
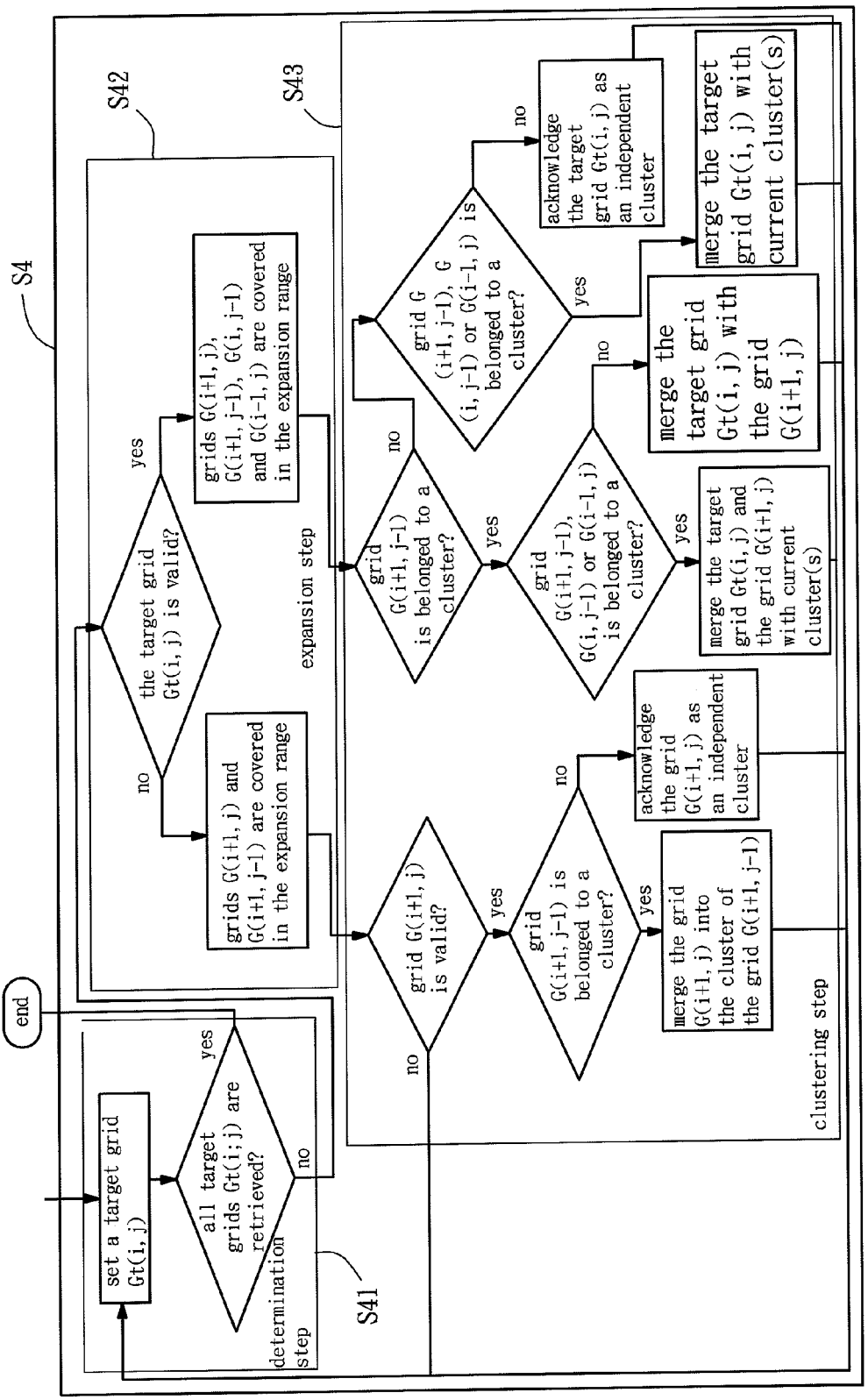
FIG. 6 shows a flowchart of an expanding/clustering step of the grid-based data clustering method of the preferred embodiment of the invention.

Referring to FIGS. 2 and 3 again, the expanding/clustering step S4 is configured to retrieve each of the grids of the target sequences, to perform an expansion operation on each of the grids retrieved, and to cluster the grids. The expanding/clustering step S4 is terminated when all the grids of the target sequences are retrieved. Referring to FIG. 6, the expanding/clustering step S4 comprises a determination step S41, an expansion step S42 and a clustering step S43, as described below.

Figure 7:
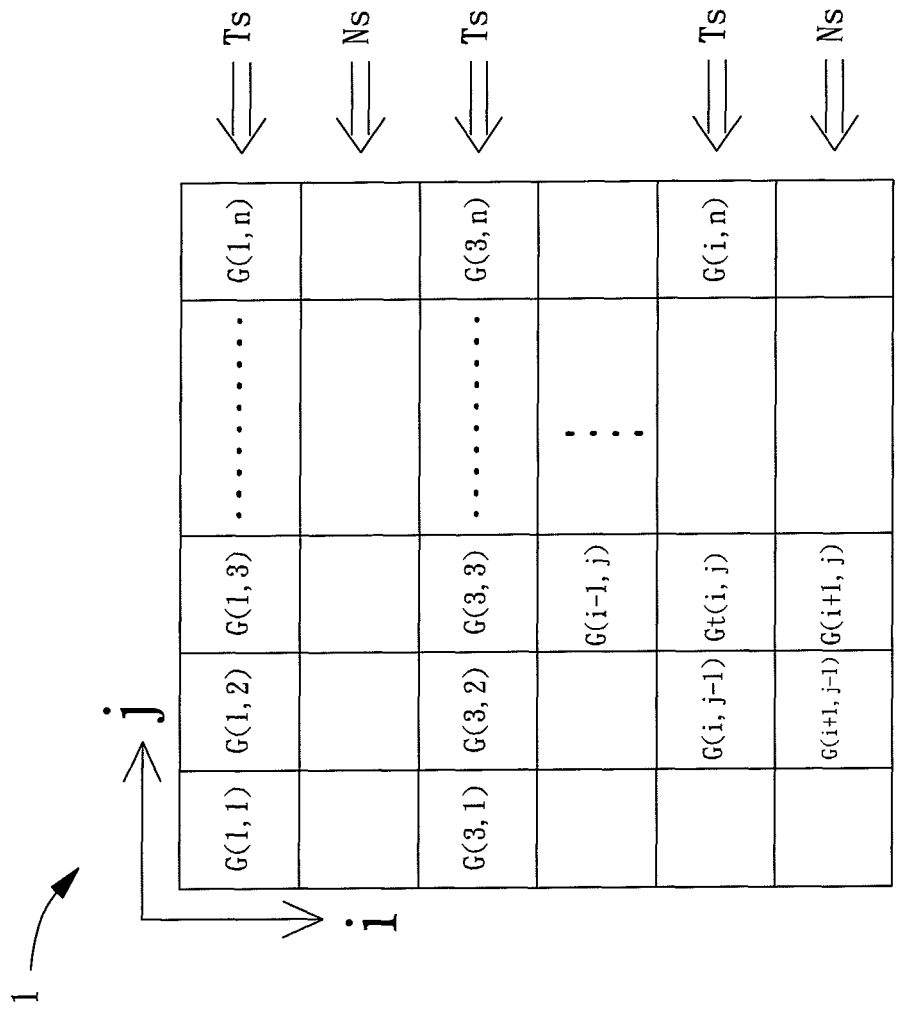
FIG. 7 shows the plurality of grids containing target sequences and non-target sequences according to the preferred embodiment of the invention.

Referring to FIGS. 6 and 7, the determination step S41 is configured to respectively set one of the grids G(i,j) of the target sequences Ts as a target grid Gt(i,j), and to determine whether all the grids G(i,j) of the target sequences Ts are retrieved. If so (the determination is positive), the procedure is terminated and the clustering operation of the data set 1 is completed. If not (the determination is negative), the procedure goes to the expansion step S42. Specifically, each of the grids G(i,j) of the target sequences Ts is respectively set as the target grid Gt(i,j) when the determination step S41 is repeatedly performed. When the target sequences Ts are designated as odd or even rows, each of the grids G(i,j) of the target sequences Ts is respectively set as the target grid Gt(i,j) in an order which starts at the grid on the top-left corner and goes from left to right and then from top to bottom. More specifically, when the target sequences Ts are designated as odd rows, the parameter "i" is set as 1, 3, 5 and so on, while the parameter "j" is set as 1, 2, 3 and so on. Alternatively, when the target sequences Ts are designated as even rows, the parameter "i" is set as 2, 4, 6 and so on, while the parameter "j" is set as 1, 2, 3 and so on. Alternatively, when the target sequences Ts are designated as odd or even columns, each of the grids G(i,j) of the target sequences Ts is respectively set as the target grid Gt(i,j) in an order which starts at the grid on the top-left corner and then from top to bottom and then from left to right. More specifically, when the target sequences Ts are designated as odd columns, the parameter "j" is set as 1, 3, 5 and so on, while the parameter "i" is set as 1, 2, 3 and so on. Alternatively, when the target sequences Ts are designated as even columns, the parameter "j" is set as 2, 4, 6 and so on, while the parameter "i" is set as 1, 2, 3 and so on. In this embodiment, the target sequences Ts are designated as odd rows for illustration purpose. However, arrangement of the target sequences Ts is not limited thereto.

Referring to FIG. 7 again, the determination step S41 sets a first grid G(1,1) of a first one of the plurality of target sequences Ts as the target grid Gt(i,j) in the beginning. Then, the procedure goes to the expansion step S42. When the determination step S41 is repeatedly performed later, each of the remaining grids G(i,j) of the first target sequence Ts, namely—the grids G(1,2), G(1,3), . . . , G(1,N), will be respectively set as the target grid Gt(i,j) in order. Then, the procedure goes to the expansion step S42. When the determination step S41 is performed at a time where the previous grid G(i,j) that was set as the target grid Gt(i,j) is the last grid G(1,N) of the first target sequence Ts, a first grid G(3,1) of a second one of the plurality of target sequences Ts is processed. Then, the procedure goes to the expansion step S42. Similarly, when the determination step S41 is repeatedly performed later, each of the remaining grids G(i,j) of the second target sequence Ts, namely—the grids G(3,2), G(3,3), . . . , G(3,N), will be respectively set as the target grid Gt(i,j) in order. Then, the procedure goes to the expansion step S42. The rest of the grids G(i,j) are processed in the same way as described above. Besides, when the determination step S41 is performed at a time where the previous grid G(i,j) that was set as the target grid Gt(i,j) is the last grid G(i,N) of the last target sequence Ts, the procedure is terminated. This is because there is no more target sequence Ts to be processed. Thus, the clustering operations of the data set 1 are completed. Since the total number of the target grids Gt(i,j) is merely one half of that of the grids G(i,j), the number of times the target grids Gt(i,j) are retrieved is reduced by half, significantly reducing the required time consumption of the subsequent expansion step S42 and the clustering step S43. As such, the data clustering efficiency can be improved.

For example, in the embodiment where the target sequences Ts are designated as odd rows (i.e. the rows R1, R3 and R5) as shown in FIG. 3, the target grids Gt(i,j) are G(1,1), G(1,2), G(1,3), G(1,4), G(1,5), G(1,6), G(3,1), G(3,2), G(3,3), G(3,4), G(3,5), G(3,6), G(5,1), G(5,2), G(5,3), G(5,4), G(5,5) and G(5,6). Each target grid Gt(i,j) requires performance of the expansion step S42. When the previous grid G(i,j) that was set as the target grid Gt(i,j) is the grid G(5,6), the clustering operations of the data set 1 are completed. This is because there does not exist a grid (7,1) for processing.

Referring to FIGS. 6 and 7, the expansion step S42 is configured to determine an expansion range based on the validity of the target grid Gt(i,j). Specifically, in a case where the target sequences Ts are designated as odd or even rows, if the target grid Gt(i,j) is invalid, the grids G(i+1,j) and G(i+1, j−1) are covered in the expansion range. As such, the grid below the target grid Gt(i,j) and the grid on the bottom left of the target grid Gt(i,j) are considered. Then, the procedure goes to the clustering step S43. To the contrary, if the target grid Gt(i,j) is valid, the grids G(i+1,j), G(i+1,j−1), G(i,j−1) and G(i−1,j) are covered in the expansion range. Namely, the grids above and below the target grid Gt(i,j) and the grids on the left and on the bottom left of the target grid Gt(i,j) are considered. Then, the procedure goes to the clustering step S43.

Figure 8A:
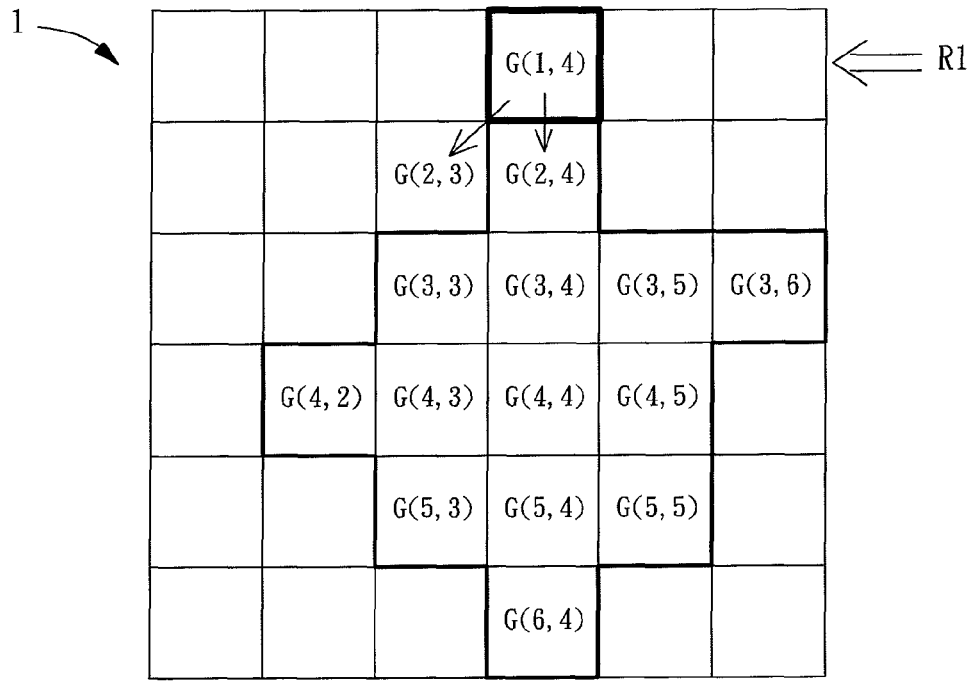
FIG. 8a shows an example of an expansion step of the expanding/clustering step of the grid-based data clustering method.
Figure 8B:
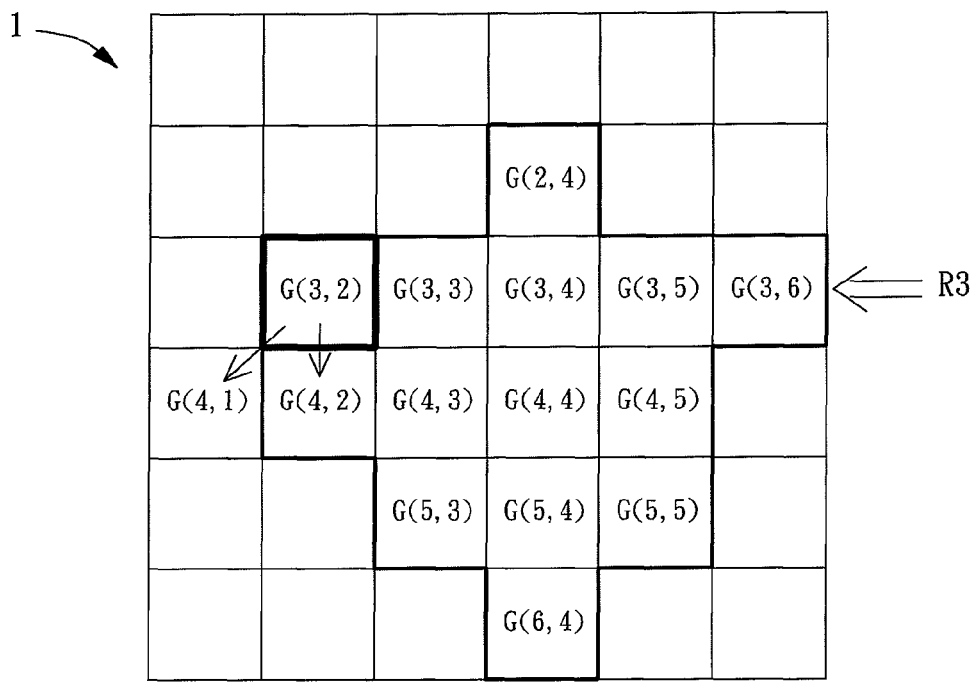
FIG. 8b shows another example of the expansion step of the expanding/clustering step of the grid-based data clustering method.
Figures 8C, 8D:
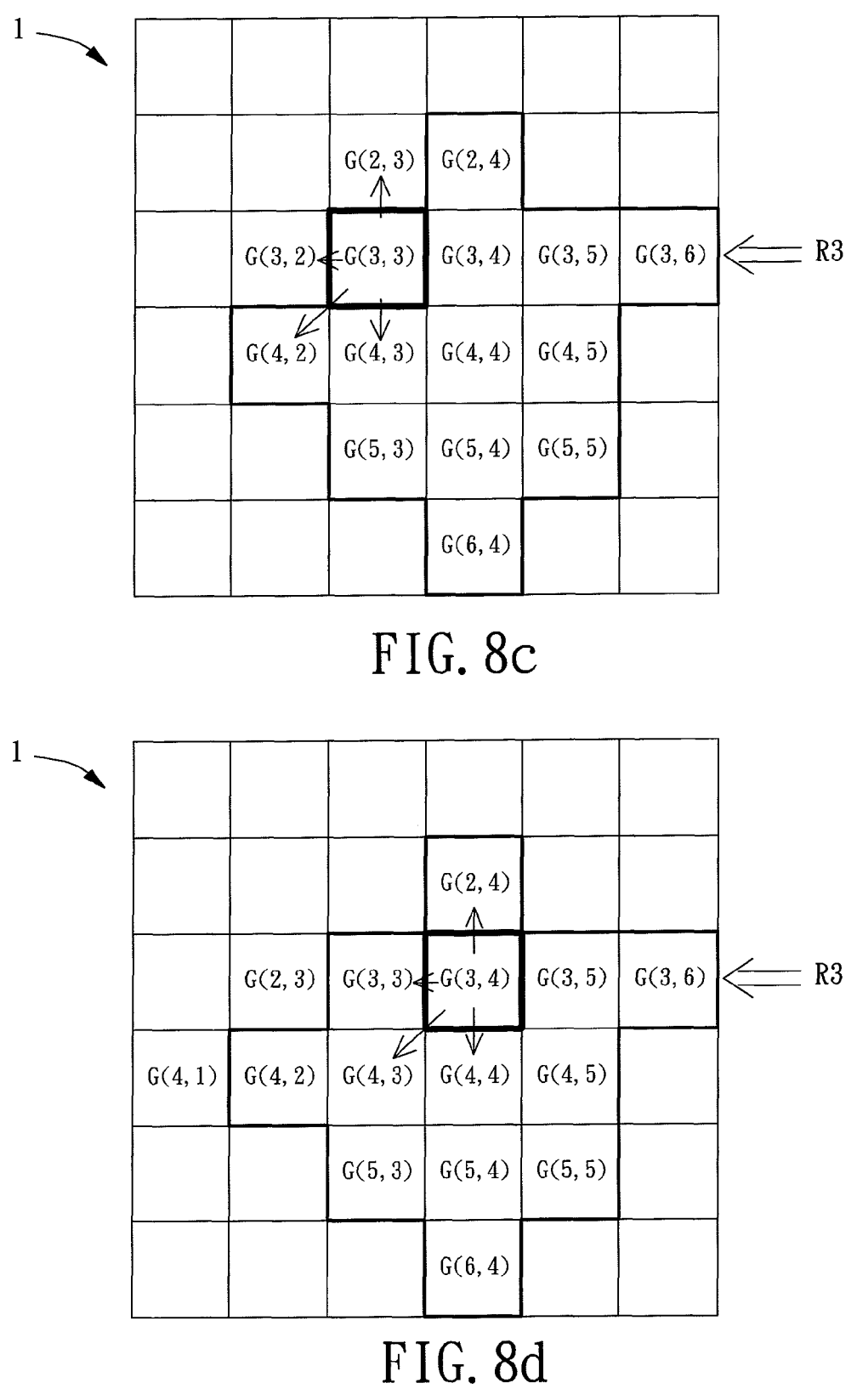
Figures 8E, 8F:
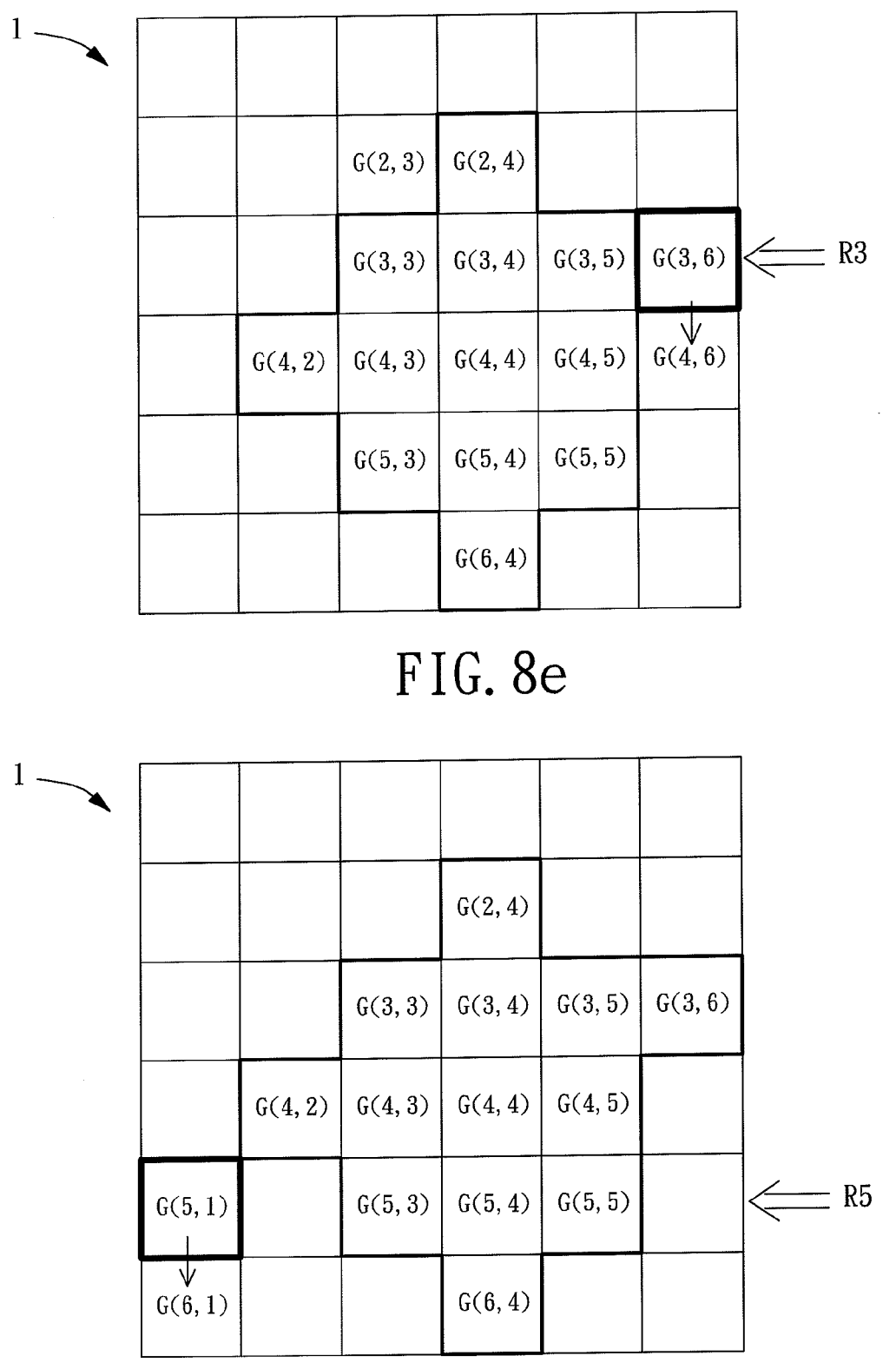

As an example, referring to FIGS. 5 and 8a, when the target grid Gt(i,j) is the grid G(1,4), the grids G(2,4) and G(2,3) are covered in the expansion range because the target grid G(1,4) is invalid. Referring to FIGS. 5 and 8b, when the target grid Gt(i,j) is the grid G(3,2), the grids G(4,2) and G(4,1) are covered in the expansion range because the target grid G(3,2) is invalid. Referring to FIGS. 5 and 8c, when the target grid Gt(i,j) is the grid G(3,3), the grids G(2,3), G(4,3), G(3,2) and G(4,2) are covered in the expansion range because the target grid G(3,3) is valid. Referring to FIGS. 5 and 8d, when the target grid Gt(i,j) is the grid G(3,4), the grids G(2,4), G(4,4), G(3,3) and G(4,3) are covered in the expansion range because the target grid G(3,4) is valid. Referring to FIGS. 5 and 8e, when the target grid Gt(i,j) is the grid G(3,6), the grids G(4,6), G(4,5), G(3,5) and G(2,6) are covered in the expansion range because the target grid G(3,6) is valid. Referring to FIGS. 5 and 8f, when the target grid Gt(i,j) is the grid G(5,1), the grid G(6,1) is covered in the expansion range because the target grid G(5,1) is invalid. The rest of the grids are processed in the same manner.

When the target sequences Ts are designated as odd or even columns, if the target grid Gt(i,j) is invalid, the grids G(i,j+1) and G(i−1,j+1) are covered in the expansion range. Namely, the grids on the right side and on top right of the target grid Gt(i,j) are considered. Then, the procedure goes to the clustering step S43. To the contrary, if the target grid Gt(i,j) is valid, the grids G(i−1,j), G(i,j−1), G(i,j+1) and G(i−1,j+1) are covered in the expansion range. Namely, the grid above the target grid Gt(i,j), the grids on the left and right sides of the target grid Gt(i,j), and the grid on the top right of the target grid Gt(i,j) are considered. Then, the procedure goes to the clustering step S43.

Referring to FIGS. 6 and 7, the clustering step S43 is configured to determine a clustering operation based on the expansion range. Then, the procedure goes back to the determination step S41. Specifically, when the grids G(i+1,j) and G(i+1,j−1) are covered in the expansion range based on the valid target grid Gt(i,j), it is determined whether the grid G(i+1,j) below is valid? If the grid G(i+1,j) below is valid, it is determined whether the grid G(i+1,j−1) on the bottom left is belonged to a specific cluster? If the grid G(i+1,j−1) on the bottom left is belonged to a specific cluster (the determination is positive), the grid G(i+1,j) is merged into the cluster of the grid G(i+1,j−1). Then, the procedure goes back to the determination step S41. If the grid G(i+1,j−1) is not belonged to any cluster (the determination is negative), the grid G(i+1,j) is acknowledged as an independent cluster. Then, the procedure goes back to the determination step S41. To the contrary, if the grid G(i+1,j) below is invalid, the determination step S41 is re-performed. The possible clustering operations for an invalid target grid Gt(i,j) are listed in Table 1 below.

TABLE 1

Possible Clustering Operations for An Invalid Target Grid Gt(i, j)

| Grid(s) Covered in The Expansion Range | G(i + 1, j) | G(i + 1, j − 1) | Clustering Operations |
|---|---|---|---|
| G(i + 1, j), G(i + 1, j − 1) | ○ | ○ | Merge G(i + 1, j) into C(i + 1, j − 1) |
| | ○ | X | Acknowledge G(i + 1, j) as Cn |
| | X | ○ | Reperform Step S41 |
| | X | X | Reperform Step S41 |

○: Valid Grid
X: Invalid Grid
C(i + 1, j − 1): Cluster of G(i + 1, j − 1)
Cn: Independent Cluster Referring to FIGS. 6 and 7 again, when the grids G(i+1,j), G(i+1,j−1), G(i,j−1) and G(i−1,j) are covered in the expansion range based on the invalid target grid Gt(i,j), it is determined whether the grid G(i+1,j) below is valid? If the grid G(i+1,j) below is valid, it is determined whether the grid G(i+1,j−1), G(i,j−1) or G(i−1,j) is belonged to a specific cluster? In other words, it is determined whether the other three grids G(i+1,j−1), G(i,j−1) and G(i−1,j) are belonged to at least one cluster? If the grids G(i+1,j−1), G(i,j−1) and G(i−1,j) are belonged to at least one cluster (the determination is positive), the target grid Gt(i,j) and the grid G(i+1,j) are merged with the at least one cluster as a merging cluster. Then, the procedure goes back to the determination step S41. If the grids G(i+1,j−1), G(i,j−1) and G(i−1,j) are not belonged to any cluster (the determination is negative), the target grid Gt(i,j) and the grid G(i+1,j) are merged as an independent cluster. Then, the procedure goes back to the determination step S41.

To the contrary, if the grid G(i+1,j) below is invalid, it is determined whether the grids G(i,j−1) or G(i−1,j) is belonged to a specific cluster? In other words, it is determined whether the grids G(i,j−1) and G(i−1,j) are belonged to at least one cluster? If the grids G(i,j−1) and G(i−1,j) are belonged to at least one cluster (the determination is positive), the target grid Gt(i,j) is merged with the at least one cluster as a merging cluster. Then, the procedure goes back to the determination step S41. If the grids G(i,j−1) and G(i−1,j) are not belonged to any cluster (the determination is negative), the target grid Gt(i,j) is acknowledged as an independent cluster. Then, the procedure goes back to the determination step S41. The possible clustering operations for a valid target grid Gt(i,j) are listed in Table 2 below.

TABLE 2

Possible Clustering Operations for A Valid Target Grid Gt(i, j)

| Grid(s) Covered in The Expansion Range | G(i + 1, j) | G(i + 1, j − 1) | G(i, j − 1) | G(i − 1, j) | Clustering Operations |
|---|---|---|---|---|---|
| G(i + 1, j), G(i + 1, j − 1), G(i, j − 1), G(i − 1, j) | ○ | ○ | ○ | ○ | Merge Gt(i, j), G(i + 1, j), C(i, j − 1) and C(i − 1, j) Together |
| | ○ | ○ | ○ | X | Merge Gt(i, j), G(i + 1, j) and C(i, j − 1) Together |
| | ○ | ○ | X | ○ | Merge Gt(i, j), G(i + 1, j) and C(i − 1, j) Together |
| | ○ | ○ | X | X | Merge Gt(i, j), G(i + 1, j) and C(i + 1, j − 1) Together |
| | ○ | X | ○ | ○ | Merge Gt(i, j), G(i + 1, j), C(i, j − 1) and C(i − 1, j) Together |
| | ○ | X | ○ | X | Merge Gt(i, j), G(i + 1, j) and C(i, j − 1) Together |
| | ○ | X | X | ○ | Merge Gt(i, j), G(i + 1, j) and C(i − 1, j) Together |
| | ○ | X | X | X | Acknowledge Gt(i, j) and G(i + 1, j) as Cn |
| | X | ○ | ○ | ○ | Merge Gt(i, j), C(i, j − 1) and C(i − 1, j) Together |
| | X | ○ | ○ | X | Merge Gt(i, j) and C(i, j − 1) Together |
| | X | ○ | X | ○ | Merge Gt(i, j) and C(i − 1, j) Together |
| | X | ○ | X | X | Acknowledge Gt(i, j) as Cn |
| | X | X | ○ | ○ | Merge Gt(i, j), C(i, j − 1) and C(i − 1, j) Together |
| | X | X | ○ | X | Merge Gt(i, j) and C(i, j − 1) Together |
| | X | X | X | ○ | Merge Gt(i, j) and C(i − 1, j) Together |
| | X | X | X | X | Acknowledge Gt(i, j) as Cn |

Figure 9A:
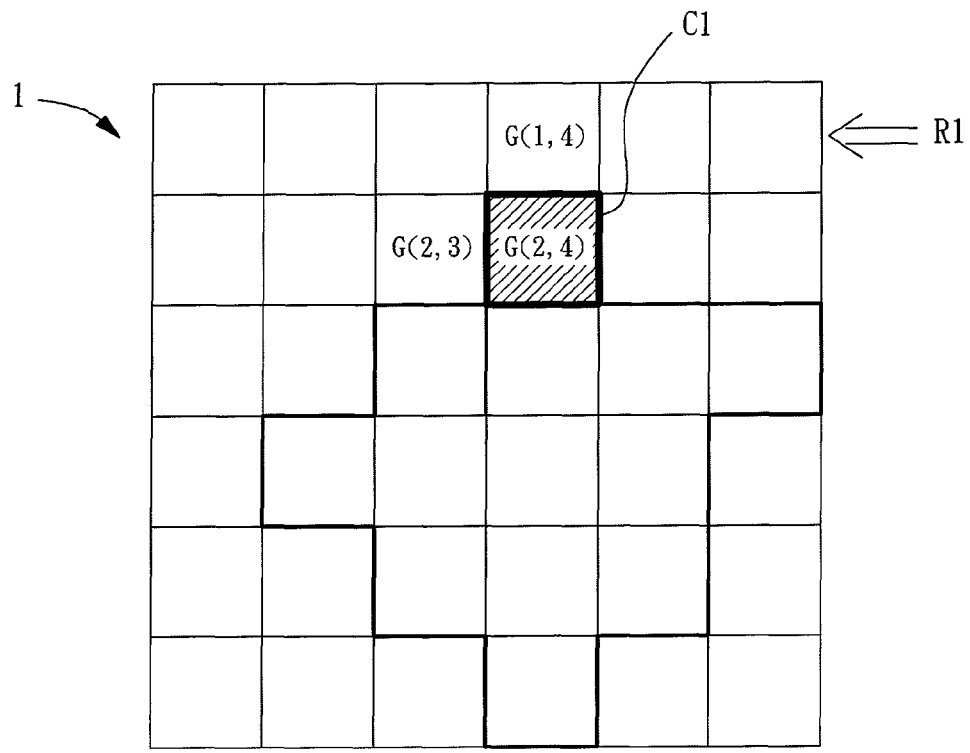
FIG. 9a shows an example of a clustering step of the expanding/clustering step of the invention.
Figure 9B:
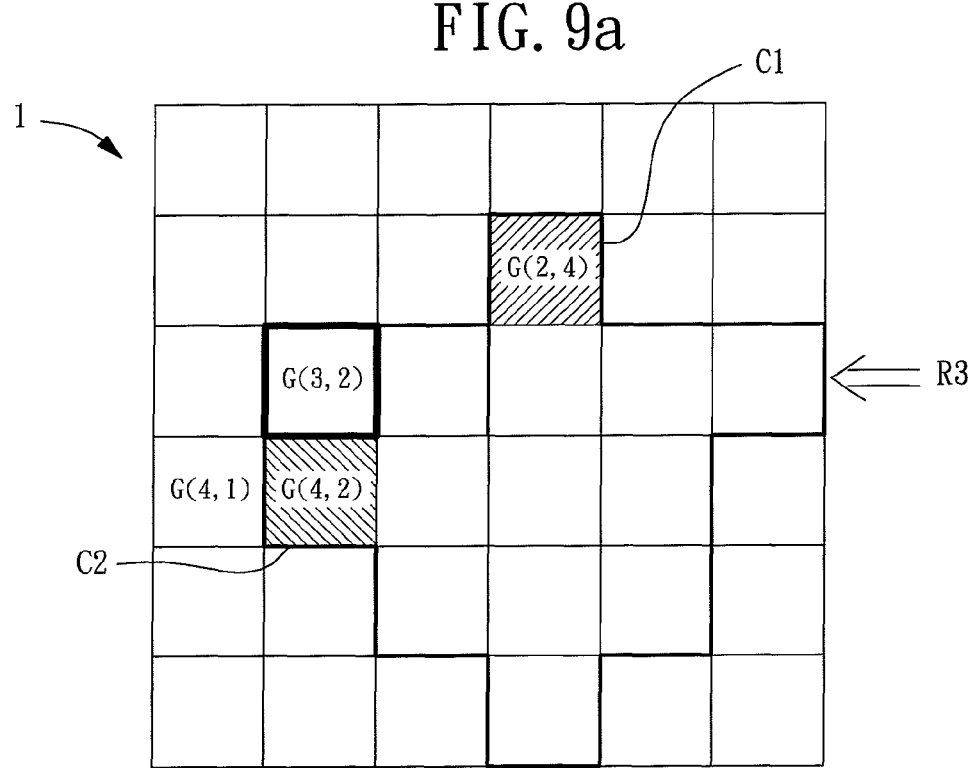
FIG. 9b shows another example of the clustering step of the expanding/clustering step of the invention.
Figure 9C:
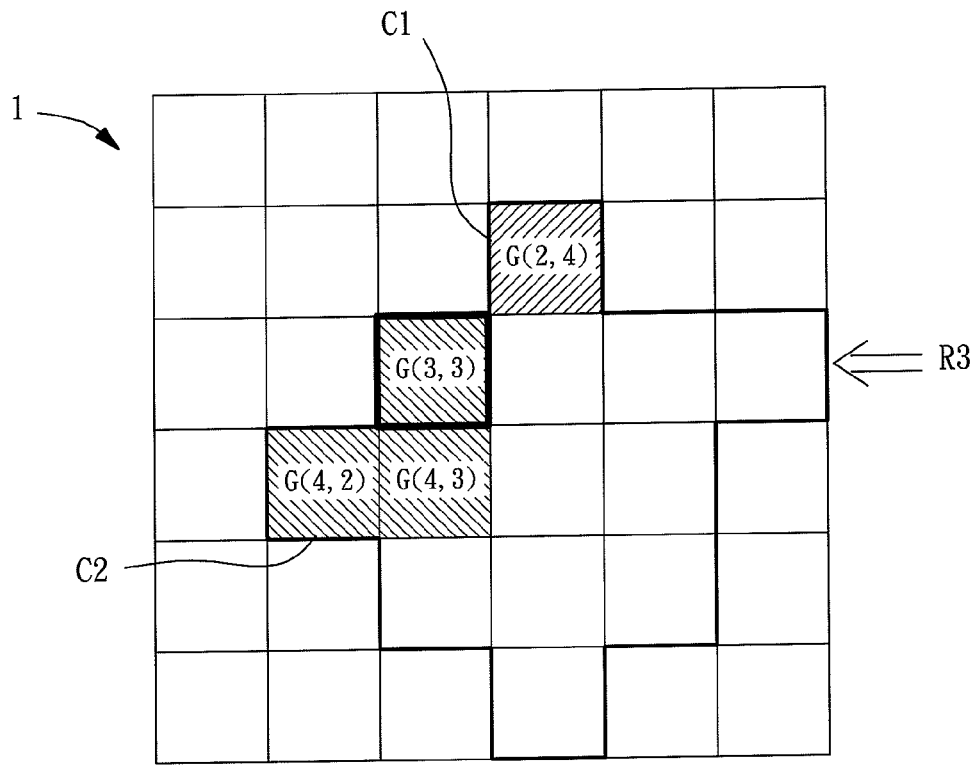
FIG. 9c shows yet another example of the clustering step of the expanding/clustering step of the invention.
Figure 9D:
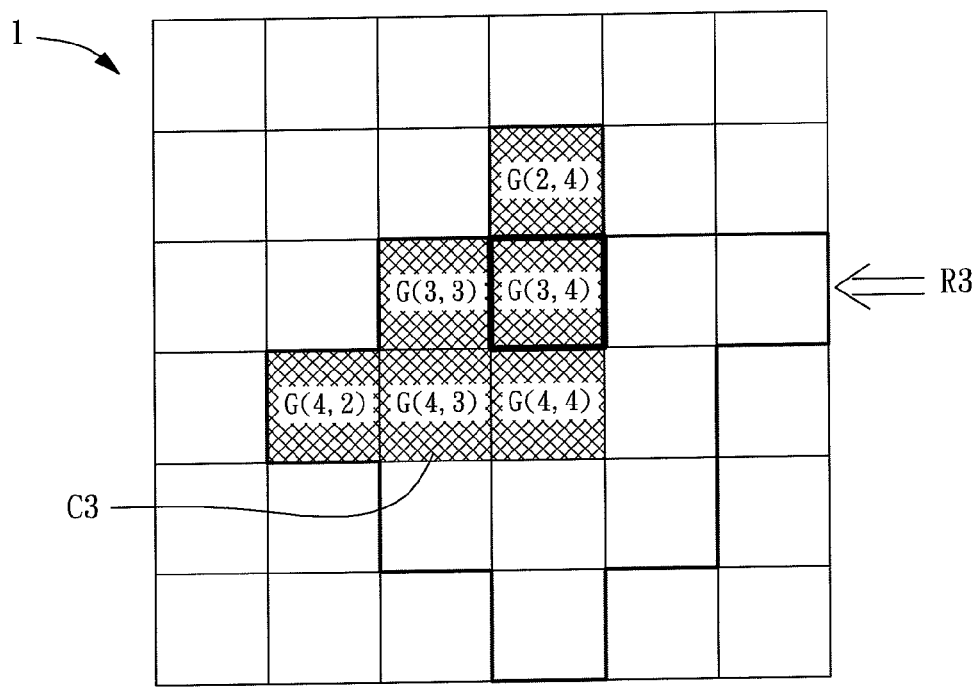
FIG. 9d shows yet another example of the clustering step of the expanding/clustering step of the invention.

○: Valid Grid
X: Invalid Grid
C(i + 1, j − 1): Cluster of G(i + 1, j − 1)
C(i, j − 1): Cluster of G(i, j − 1)
C(i − 1, j): Cluster of G(i − 1, j)
Cn: Independent Cluster For example, referring to FIGS. 8*a* and 9*a*, when the target grid Gt(i,j) is G(1,4), the grids G(2,4) and G(2,3) are covered in the expansion range. Therefore, the grids G(2,4) and G(2,3) are considered. Since the grid G(2,4) is valid and the grid G(2,3) is invalid (not belonged to any cluster), the grid G(2,4) is acknowledged as an independent cluster C1 as shown in FIG. 9*a*. Then, when the target grid Gt(i,j) is G(3,2) as shown in FIGS. 8*b* and 9*b*, the grids G(4,2) and G(4,1) are covered in the expansion range. Therefore, the grids G(4,2) and G(4,1) are considered. Since the grid G(4,2) is valid and the grid G(4,1) is invalid (not belonged to any cluster), the grid G(4,2) is acknowledged as another cluster C2 independent from the cluster C1, as shown in FIG. 9b. Then, when the target grid Gt(i,j) is G(3,3) as shown in FIGS. 8c, 9b and 9c, the grids (4,3), G(4,2), G(3,2) and G(2,3) are covered in the expansion range. Therefore, the grids (4,3), G(4,2), G(3,2) and G(2,3) are considered. Since the grid G(4,3) is valid and only the grid G(4,2) was clustered as the cluster C2, the grids G(3,3) and G(4,3) are merged into the cluster C2 as shown in FIG. 9c. Then, when the target grid Gt(i,j) is G(3,4) as shown in FIGS. 8d, 9c and 9d, the grids G(4,4), G(4,3), G(3,3) and G(2,4) are covered in the expansion range. Therefore, the grids G(4,4), G(4,3), G(3,3) and G(2,4) are considered. In this case, the grid G(4,4) is valid, the grids G(3,3), G(4,3) were clustered as the cluster C2, and the grid G(2,4) was clustered as the cluster C1. Thus, the grids G(3,4) and G(4,4) are merged with the clusters C1 and C2 as a merging cluster C3. The rest of the target grids are processed in the same way, so it is not described herein again for brevity.

Similarly, when the grids G(i,j+1) and G(i-1,j+1) are covered in the expansion range, it is determined whether the grid G(i,j+1) is valid? If the grid G(i,j+1) is valid, it is determined whether the grid G(i-1,j+1) is belonged to a specific cluster? If the grid G(i-1,j+1) is belonged to a specific cluster (the determination is positive), the grid G(i,j+1) is merged into the cluster of the grid G(i-1,j+1). Then, the procedure goes back to the determination step S41. If the grid G(i-1,j+1) is not belonged to any cluster (the determination is negative), the grid G(i,j+1) is acknowledged as an independent cluster. Then, the procedure goes back to the determination step S41. To the contrary, of the grid G(i,j+1) is invalid, the determination step S41 is re-performed.

Furthermore, when the grids G(i,j+1), G(i-1,j+1), G(i-1,j) and G(i,j-1) are covered in the expansion range, it is determined whether the grid G(i,j+1) is valid? If the grid G(i,j+1) is valid, it is determined whether the grid G(i-1,j+1), G(i-1,j) or G(i,j-1) is belonged to a specific cluster? In other words, it is determined whether the grids G(i-1,j+1), G(i-1,j) or G(i, j-1) are belonged to at least one cluster? If the grids G(i-1, j+1), G(i-1,j) or G(i,j-1) are belonged to at least one cluster (the determination is positive), the target grid Gt(i,j) and the grid G(i,j+1) are merged with the at least one cluster as a merging cluster. Then, the procedure goes back to the determination step S41. If the grids G(i-1,j+1), G(i-1,j) or G(i,j-1) are not belonged to any cluster (the determination is negative), the target grid Gt(i,j) and the grid G(i,j+1) are merged as an independent cluster. Then, the procedure goes back to the determination step S41. To the contrary, if the grid G(i,j+1) is invalid, it is determined whether the grid G(i-1,j) or G(i,j-1) is belonged to a specific cluster? In other words, it is determined whether the grids G(i-1,j) and G(i,j-1) are belonged to at least one cluster? If the grids G(i-1,j) and G(i,j-1) are belonged to at least one cluster (the determination is positive), the target grid Gt(i,j) is merged with the at least one cluster as a merging cluster. Then, the procedure goes back to the determination step S41. If the grids G(i-1,j) and G(i,j-1) are not belonged to any cluster (the determination is negative), the target grid Gt(i,j) is acknowledged as an independent cluster. Then, the procedure goes back to the determination step S41.

To prove the proposed method as being faster and more accurate than the conventional data clustering methods in data clustering, as well as being more efficient than the conventional data clustering methods in filtering the noise data points, data sets A to F are provided for experimental purpose. The experimental results of the data sets A to F using the proposed method are compared to those of the data sets A to F using the conventional DBSCAN, IDBSCAN and GOD-CS data clustering methods. The data set A comprises 10 clusters, the data set B comprises 5 clusters, the data set C comprises 4 clusters, the data set D comprises 2 clusters, the data set E comprises 4 clusters, and the data set F comprises 4 clusters. The data sets A to F have different patterns from each other. Each of the data sets A to F has 575,000 data points, including 75,000 noise data points.

Table 3 below shows the grid quantity Q and the threshold value M set in the setup step S1.

TABLE 3

Experimental Parameters

| Parameter | Data Set A | Data Set B | Data Set C | Data Set D | Data Set E | Data Set F |
|---|---|---|---|---|---|---|
| Grid quantity Q | 244 | 244 | 244 | 220 | 244 | 244 |
| Threshold Value M | 14 | 14 | 14 | 17 | 14 | 14 |

The experimental equipment includes a Central Processing Unit (CPU) of 3.4 GHz (Intel Pentium D) and a memory of 2 GB, with the computer program implemented by Java algorithm and executed under the operation system of Windows 7.

Table 4 shows the experimental results of the data sets A to F obtained by the proposed method and the conventional data clustering methods.

TABLE 4

Experimental Results

| Algorithm | Test Item | Data Set A | Data Set B | Data Set C | Data Set D | Data Set E | Data Set F |
|---|---|---|---|---|---|---|---|
| DBSCAN | TC | 27502.78 | 27393.79 | 28154.62 | 27286.21 | 27458.72 | 26986.94 |
|  | CCR | 100.0% | 98.46% | 99.98% | 99.96% | 99.91% | 99.89% |
|  | NFR | 95.59% | 94.93% | 90.01% | 96.65% | 96.25% | 97.32% |
| IDBSCAN | TC | 3835.13 | 3571.24 | 3363.77 | 3234.03 | 3959.71 | 3961.03 |
|  | CCR | 100.0% | 99.96% | 100.0% | 99.95% | 99.98% | 99.96% |
|  | NFR | 95.13% | 94.25% | 90.18% | 96.40% | 96.01% | 97.88% |
| GOD-CS | TC | 0.36 | 0.32 | 0.30 | 0.34 | 0.36 | 0.35 |
|  | CCR | 98.54% | 99.48% | 99.52% | 99.48% | 99.21% | 99.36% |
|  | NFR | 99.43% | 99.31% | 99.13% | 99.58% | 99.56% | 99.45% |
| The Invention | TC | 0.13 | 0.11 | 0.11 | 0.10 | 0.13 | 0.11 |
|  | CCR | 99.50% | 98.65% | 99.05% | 98.93% | 99.36% | 99.41% |
|  | NFR | 98.90% | 99.55% | 99.36% | 99.56% | 99.33% | 99.23% |

TC (Sec): Time Consumption
CCR (%): Clustering Correct Rate
NFR (%): Noise Filtering Rate Referring to Table 4 again, the comparison results between the proposed method and the conventional methods show that the proposed method can provide an improved clustering accuracy and noise filtering rate over the conventional data clustering methods while significantly reducing the time consumption. Therefore, it is verified that the invention is capable of providing a desired clustering effect.

In summary, in the proposed method of the invention, the space containing the data set 1 is divided into a plurality of grids according to the grid quantity Q. Then, it is determined whether each grid G(i,j) is valid according to the threshold value M. Next, the plurality of grids is categorized into a plurality of odd rows or a plurality of even rows. The plurality of odd or even rows is acknowledged as a plurality of target sequences. Then, each of the grids G(i,j) is respectively acknowledged as a target grid Gt(i,j). In this mechanism, the total number of target grids Gt(i,j) is merely half of that of the plurality of grids, reducing the number of times the grids will be processed. As such, the data clustering efficiency is improved.

In addition, in contrast to the conventional data clustering methods which require setting a larger number of parameters while the performance thereof is unstable, the data clustering operations of the invention can be immediately proceeded by a user simply setting the grid quantity Q and the threshold value M. Therefore, the grid-based data clustering method of the invention can significantly reduce the time consumption resulting from attempts to determine optimal parameter values, providing a convenient use for a user.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A grid-based data clustering method performed by a computer system, comprising:
   a setup step setting a grid quantity and a threshold value;
   a dividing step dividing a space containing a data set having a plurality of data points into a two-dimensional matrix based on the grid quantity, wherein the matrix has a plurality of grids G(i,j) comprising a plurality of target sequences and a plurality of non-target sequences interlaced with the plurality of target sequences, and the variables "i" and "j" of each grid G(i,j) represents the coordinate thereof;
   a categorizing step determining whether each of the grids is valid based on the threshold value; and
   an expanding/clustering step respectively retrieving each of the grids of the target sequences, performing an expansion operation on each of the grids retrieved and clustering the plurality grids G(i,j).

2. The grid-based data clustering method performed by a computer system as claimed in claim 1, wherein both dimensions of the matrix have a quantity of grids being the grid quantity.

3. The grid-based data clustering method performed by a computer system as claimed in claim 1, wherein the categorizing step determines whether a number of the data points contained in each grid G(i,j) is smaller than the threshold value, the grid G(i,j) is acknowledged as an invalid grid if the number of the data points contained therein is smaller than the threshold value, and the grid G(i,j) is acknowledged as a valid grid if the number of the data points contained therein is not smaller than the threshold value.

4. The grid-based data clustering method performed by a computer system as claimed in claim 1, wherein the plurality of target sequences is designated as odd rows, even rows, odd columns or even columns of the matrix.

5. The grid-based data clustering method performed by a computer system as claimed in claim 1, wherein the expanding/clustering step comprises:
   a determination step respectively setting one of the grids G(i,j) of the target sequences as a target grid Gt(i,j), and determining whether all the grids G(i,j) of the target sequences are retrieved, wherein the procedure is terminated if the determination of the determination step is positive;
   an expansion step determining an expansion range of the target grid Gt(i,j) based on whether the target grid Gt(i,j) is valid or not; and
   a clustering step performing a clustering operation based on the expansion range of the target grid Gt(i,j), and re-performing the determination step.

6. The grid-based data clustering method performed by a computer system as claimed in claim 5, wherein grids G(i+1,j) and G(i+1,j−1) of the matrix are covered in the expansion range when the target grid Gt(i,j) is invalid.

7. The grid-based data clustering method performed by a computer system as claimed in claim 6, wherein it is determined whether the grid G(i+1,j−1) is belonged to a cluster if the grid G(i+1,j) is valid, the grid G(i+1,j) is merged into the cluster of the grid G(i+1,j−1) if the determination is positive, and the grid G(i+1,j) is acknowledged as an independent cluster if the determination is negative.

8. The grid-based data clustering method performed by a computer system as claimed in claim 6, wherein the determination step is re-performed if the grid G(i+1,j) is invalid.

9. The grid-based data clustering method performed by a computer system as claimed in claim 5, wherein grids G(i+1,j), G(i+1,j−1), G(i,j−1) and G(i−1,j) of the matrix are covered in the expansion range when the target grid Gt(i,j) is valid.

10. The grid-based data clustering method performed by a computer system as claimed in claim 9, wherein it is determined whether the grids G(i+1,j−1), G(i,j−1) and G(i−1,j) are belonged to at least one cluster if the grid G(i+1,j) is valid, the target grid Gt(i,j) and the grid G(i+1,j) are merged with the at least one cluster as a merging cluster if the determination is positive, and the target grid Gt(i,j) and the grid G(i+1,j) are merged as an independent cluster if the determination is negative.

11. The grid-based data clustering method performed by a computer system as claimed in claim 9, wherein it is determined whether the grids G(i,j−1) and G(i−1,j) are belonged to at least one cluster if the grid G(i+1,j) is invalid, the target grid Gt(i,j) is merged with the at least one cluster as a merging cluster if the determination is positive, and the target grid Gt(i,j) is acknowledged as an independent cluster if the determination is negative.

12. The grid-based data clustering method performed by a computer system as claimed in claim 5, wherein grids G(i,j+1) and G(i−1,j+1) of the matrix are covered in the expansion range when the target grid Gt(i,j) is invalid.

13. The grid-based data clustering method performed by a computer system as claimed in claim 12, wherein it is determined whether the grid G(i−1,j+1) is belonged to a cluster if the grid G(i,j+1) is valid, the grid G(i,j+1) is merged into the cluster of the grid G(i−1,j+1) if the determination is positive, and the grid G(i,j+1) is acknowledged as an independent cluster if the determination is negative.

14. The grid-based data clustering method performed by a computer system as claimed in claim 12, wherein the determination step is re-performed if the grid $G(i,j+1)$ is invalid.

15. The grid-based data clustering method performed by a computer system as claimed in claim 5, wherein grids $G(i,j+1)$, $G(i-1,j+1)$, $G(i-1,j)$ and $G(i,j-1)$ of the matrix are covered in the expansion range when the target grid $Gt(i,j)$ is valid.

16. The grid-based data clustering method performed by a computer system as claimed in claim 15, wherein it is determined whether the grids $G(i-1,j+1)$, $G(i-1,j)$ and $G(i,j-1)$ are belonged to at least one cluster if the grid $G(i,j+1)$ is valid, the target grid $Gt(i,j)$ and the grid $G(i,j+1)$ are merged with the at least one cluster as a merging cluster if the determination is positive, and the target grid $Gt(i,j)$ and the grid $G(i,j+1)$ are merged as an independent cluster if the determination is negative.

17. The grid-based data clustering method performed by a computer system as claimed in claim 15, wherein it is determined whether the grids $G(i-1,j)$ and $G(i,j-1)$ are belonged to at least one cluster if the grid $G(i,j+1)$ is invalid, the target grid $Gt(i,j)$ is merged with the at least one cluster as a merging cluster if the determination is positive, and the target grid $Gt(i,j)$ is acknowledged as an independent cluster if the determination is negative.

\* \* \* \* \*